428-408 SR

11/13/84 XR 4,482,600

United States Patent [19]

Matsumoto et al.

[11] Patent Number: 4,482,600

[45] Date of Patent: Nov. 13, 1984

[54] SPOT-WELDABLE LIGHTWEIGHT COMPOSITE MATERIAL

[75] Inventors: Yoshihiro Matsumoto, Chiba; Masatoshi Shinozaki, Mobara; Toshio Irie, Chiba, all of Japan

[73] Assignee: Kawasaki Steel Corporation, Kobe, Japan

[21] Appl. No.: 415,373

[22] Filed: Sep. 7, 1982

[30] Foreign Application Priority Data

Mar. 18, 1982 [JP] Japan .............................. 57-43207

[51] Int. Cl.[3] .......................... B32B 7/02; B32B 9/00

[52] U.S. Cl. .................................. 428/213; 428/323; 428/408; 428/457; 428/458; 428/461

[58] Field of Search ............... 428/457, 213, 323, 408, 428/461, 458

[56] References Cited

FOREIGN PATENT DOCUMENTS 57-146649 9/1982 Japan .................................. 428/408

OTHER PUBLICATIONS

English Translation of Japanese Patent Laid-Open Specification No. 146,649, Sep. 10, 1982, 4 pages.

J. A. DiCello, SAE Tech. Paper Series, "Steel-Polypropylene-Steel Laminate", Feb. 25-29, 1980, No. 80078, 18 pages.

W. K. Miller, SAE Tech. Paper Series, No. 80077, Metal-Plastic Laminates for Vehicle Weight Reduction, Feb. 25-29, 1980, 12 pages.

*Primary Examiner*—Thomas J. Herbert

*Attorney, Agent, or Firm*—Balogh, Osann, Kramer, Dvorak, Genova & Traub

[57] ABSTRACT

A lightweight composite material consisting of two metal sheets and an intermediate layer consisting of a mixture of resin and graphite and held between the metal sheets. The intermediate layer has a specifically limited thickness and a specifically limited graphite content, and the graphite has a specifically limited particle size distribution. The composite material is excellent in the spot weldability, bending rigidity, vibration-damping property and heat insulating property, and can be expected to be widely used as a material for automobile and further materials for industrial machine and architecture.

1 Claim, 3 Drawing Figures

Graphite Content (R) in the Intermediate Layer (% by Weight)

40 30 20 10 0

$\sqrt{R} \times V = 240$

<20 20-39 40-59 60-80 80<

Volume Percentage of Graphite Particles Having a Size of 300~600μm based on the Total Graphite (V)

FIG_1
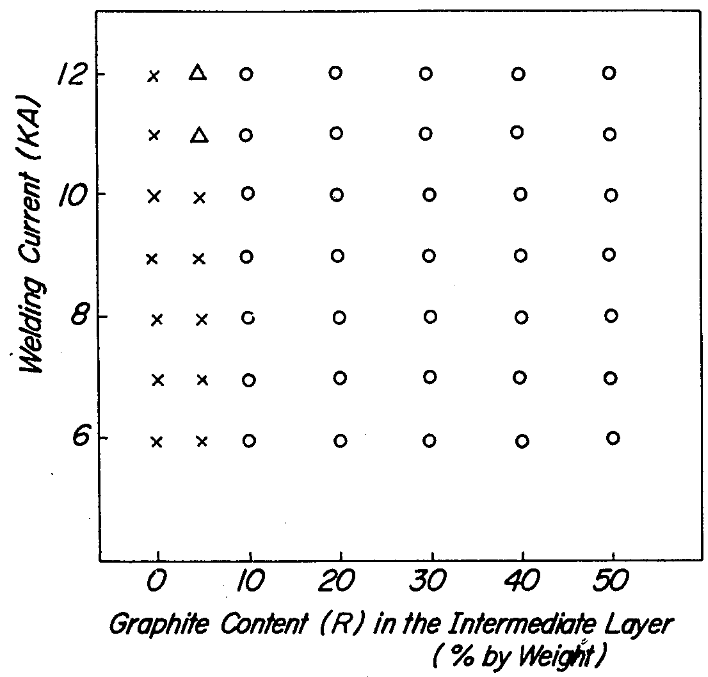

FIG_2
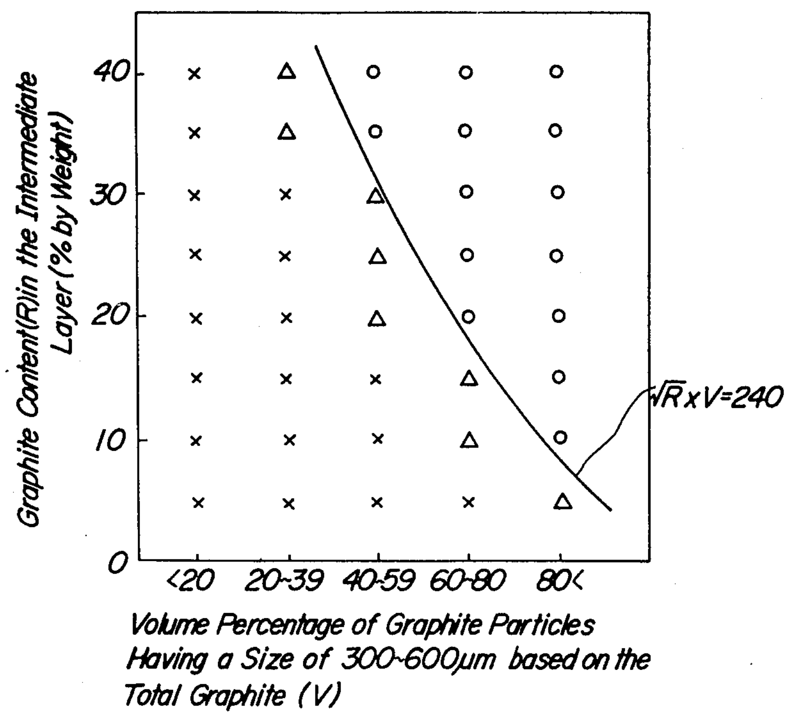
FIG_3
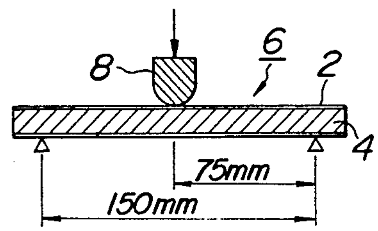

SPOT-WELDABLE LIGHTWEIGHT COMPOSITE MATERIAL

BACKGROUND OF THE INVENTION

1. Field of the Invention

The present invention relates to a spot-weldable lightweight composite material, and particularly relates to a spot-weldable lightweight composite material having excellent bending rigidity.

2. Description of the Prior Art

There has been proposed an automobile having a lightweight body in order to decrease the fuel consumption. In order to decrease the weight of car body, the car body is made into a smaller size, the front engine-front driving system mechanism is used, the thickness of automotive steel sheet is decreased by using high tensile steel sheet, and further a weight-saving material is used. However, even when high tensile steel sheet is used in portions, for example, ceiling and the like, which are required to have rigidity, the sheet thickness cannot be decreased, and these portions have not yet been made into light weight.

The use of composite material of a so-called laminate steel sheet, which consists of two steel sheets and an intermediate resin layer having a thickness larger than the sum of the thicknesses of the steel sheets, can decrease greatly the body weight without decreasing rigidity. The composite material has been disclosed by General Motors Corp. and National Steel Co. in a Meeting of SAE, held in Detroit in U.S.A. in February, 1980, and has created a sensation. However, the resin, that is, an organic polymer material, to be used in the intermediate layer of laminated steel sheet, is a good insulating material, and therefore the laminated steel sheet has a serious drawback that the sheet cannot be subjected to a spot welding, which is an indispensable treatment in the material for automobile, although the use of a large amount of the sheets as the material can be expected. In order to obviate this drawback, fastening by bolt, adhesion by adhesive and other various particular methods have been attempted at the use of the laminate steel sheet. However, the drawback has not yet been completely solved.

Composite materials consisting of two metal sheets and a resin held between the metal sheets have hitherto been known not only as a weight-saving material but also as a composite type vibration-damping steel sheet, which absorbs vibration energy by utilizing the visco-elasticity of the resin. A method of giving the spot weldability to the composite type vibration-damping steel sheet is disclosed in Japanese Patent Laid-Open Application No. 128,687/78, wherein a resin is mixed with metal powders, such as iron powders and the like.

However, the laminated steel sheet to be used for weight saving has a very thick intermediate layer dissimilarly to vibration-damping steel sheet, and therefore even when metal powder is merely contained in the intermediate layer, it is very difficult to give spot weldability to the laminated steel sheet to be used for weight saving. The inventors have proposed in Japanese Patent Application No. 32,407/81 a method of compounding graphite powder into an intermediate layer in order that a vibration-damping steel sheet can be spot welded. However, spot weldability was not able to be given to a laminated steel sheet by the method described in the above described Japanese Patent Application No. 32,407/81 due to the difference between the vibration-damping steel sheet and the laminated steel sheet in the thickness of intermediate layer.

SUMMARY OF THE INVENTION

The object of the present invention is to provide a spot-weldable lightweight composite material free from the above described problems in the conventional methods.

That is, the novel feature of the present invention lies in a spot-weldable lightweight composite material consisting of two metal sheets and an intermediate layer consisting of a mixture of resin and graphite and held between the metal sheets, an improvement including the intermediate layer having a thickness not smaller than the sum of the thicknesses of the metal sheets and having a graphite content R of 10–50% by weight, and the graphite having a particle size distribution which satisfies the following relation, $$\sqrt{R} \times V \geqq 240$$

wherein R represents the above described graphite content, and V represents the volume percentage of graphite particles, which have a size within the range of from $\frac{1}{2}$ to 1 time thickness of the intermediate layer, based on the total amount of the graphite.

BRIEF DESCRIPTION OF THE DRAWINGS

FIG. 1 is a graph illustrating influences of the graphite content R in the intermediate layer and the welding electric current upon the spot weldability of the laminated steel sheet;

FIG. 2 is a graph illustrating influences of the graphite content R in the intermediate layer and the particle size distribution of graphite upon the spot weldability of the laminated steel sheet; and FIG. 3 is a cross-sectional view of a composite material illustrating a measuring method of the bending rigidity.

DESCRIPTION OF THE PREFERRED EMBODIMENT

The inventors have made various investigations and found out that, even in the case where a laminated steel sheet has an intermediate layer having a thickness of 0.4–0.6 mm or more, when the kind, the particle size distribution and the amount of electroconductive particle to be compounded with resin are properly selected, and a mixture of the electroconductive particle and resin is treated under a condition not to cause secondary aggregation of the electroconductive particles in the intermediate layer, the electroconductive particles are uniformly distributed in the intermediate layer, and the spot welding of the laminated steel sheet can be carried out. The present invention is based on this discovery.

In the present invention, the intermediate layer held between two metal sheets is formed of resin and graphite. The intermediate layer consisting of resin and graphite has a thickness not smaller than the sum of the thicknesses of two metal sheets due to the reason that the weight of the resulting composite material is saved in order to attain an object different from that of the composite type vibration-damping steel sheet.

An explanation will be made hereinafter with respect to a basic experiment relating to graphite content in the intermediate layer and particle size distribution of graphite, which has been carried out in order to give spot weldability to the resulting composite material. After graphite powders, whose particle size has been adjusted such that particles having a size of from 0.3 mm (50 meshes) to 0.6 mm occupy 80% of the total volume of the graphite powders, are subjected to a treatment for preventing secondary aggregation, an intermediate layer having a thickness of 0.6 mm and having a variant content of the graphite powders within the range of 0–50% by weight was formed, and this intermediate layer was held between two cold rolled steel sheets, each having a thickness of 0.2 mm, and the resulting mass was pressed at warm temperature to adhere the intermediate layer to the steel sheets. The spot weldability of the resulting laminated steel sheet having a total thickness of 1.0 mm to a cold rolled steel sheet having a thickness of 1.0 mm was investigated by varying the welding electric current value under a condition that the electrode force was 225 kg and the weld time was 10 cycles of an AC current having a frequency of 50 cycles. The obtained results are shown in FIG. 1. In FIG. 1, the mark "o" indicates that all of the laminated steel sheets can be spot welded; the mark "Δ" indicates that a part of the sheets can be spot welded; and the mark "x" indicates that none of the sheets can be spot welded. It can be seen from FIG. 1 that, when the intermediate layer consists only of resin and has a graphite content of less than 10%, the laminated steel sheet cannot be spot welded by any electric current values; and when the intermediate layer has a graphite content of not less than 10% by weight, the sheet can be spot welded in any electric current values used in the test. While, when the intermediate layer has a graphite content of more than 50% by weight, the layer has no longer softness and viscoelasticity peculiar to resin, and the intermediate layer itself cannot be formed. The above described laminated steel sheet having a total thickness of 1.0 mm and having an intermediate layer containing 10–50% by weight of graphite whose particle size distribution had been adjusted, was able to be spot welded, in spite of the fact that the intermediate layer had a thickness of as large as 60% based on the total thickness of the laminated steel sheet, under a condition that the electrode force was 225 kg, the weld time was 10 cycles of an AC current having a frequency of 50 cycles, and the welding current was 8.8 kA, which condition is the A class condition relating to spot welding between steel sheets of 1.0 mm thickness and being recommended by the Resistance Welding Manufacturer's Association (RWMA). Based on the above described reason, the graphite content R in the intermediate layer is limited to 10–50% by weight in the present invention.

When graphite having a particle size larger than the thickness of an intermediate layer is used, the thickness of the intermediate layer is determined depending upon the particle size, and therefore an aimed thickness of intermediate layer cannot be obtained. Therefore, the particle size of graphite must be smaller than the thickness of intermediate layer. While, graphite particle having a size smaller than ½ thickness of intermediate layer is completely sealed from surrounding particles by resin, and therefore an electric conductivity necessary for welding cannot be secured. Accordingly, the graphite to be contained in the intermediate layer must contain not less than a certain amount of particles having a size not smaller than ½ thickness of the layer.

The inventors have carried out the following experiment relating to the influence of the particle size distribution of graphite upon the spot weldability of the resulting laminated steel sheet in order to determine the amount of the above described particles, which have a size not smaller than ½ thickness of intermediate layer, based on the total amount of graphite. After graphite containing particles having a size of 300–600 μm in a variant volume percentage based on the total amount of the graphite was subjected to a treatment for preventing secondary aggregation, an intermediate layer having a thickness of 0.6 mm and having a variant graphite content R was formed and then held between two cold rolled steel sheets, and the resulting mass was pressed at warm temperature to adhere the intermediate layer to the steel sheets. The weldability of the resulting laminated steel sheet having a total thickness of 1.0 mm to a cold rolled steel sheet having a thickness of 1.0 mm was investigated by carrying out a spot welding of these steel sheets under a condition that the electrode force was 225 kg, the weld time was 10 cycles of an AC current having a frequency of 50 cycles and the welding electric current was 8.8 kA. The obtained results are shown in FIG. 2. In FIG. 2, the mark "o" indicates that all of the laminated steel sheets can be spot welded; the mark "Δ" indicates that a part of the sheets can be spot welded; and the mark "x" indicates that none of the sheets can be spot welded, similarly to FIG. 1.

It can be seen from FIG. 2 that, when a relation between the graphite content R (in % by weight) in the intermediate layer and the volume percentage V of graphite particles, which have a size within the range of from ½ to 1 time thickness of 0.6 mm of the intermediate layer, that is, have a size within the range of 300–600 μm, based on the volume of total graphite satisfies the following formula of $\sqrt{R} \times V \geqq 240$, that is, when the product of $\sqrt{R} \times V$ lies in the region not lower than the curved line shown in FIG. 2, all of the resulting laminated steel sheets are able to be spot welded. As the results of the above described experiment, the relation between the graphite content R (in % by weight) in the intermediate layer and the volume percentage V of graphite having the above defined particle size to the volume of total graphite is limited so as to satisfy the formula of $\sqrt{R} \times V \geqq 240$.

Even when an intermediate layer formed of resin and graphite in amounts satisfying the above described condition is further mixed with a filler or the like, which promotes the adhesion of the layer with metal sheets, the electroconductivity of the resulting intermediate layer does not deteriorate at all. Further, even when metals, such as Cu and the like, having high electroconductivity other than graphite are added to the intermediate layer in order to improve the electroconductivity thereof, noticeable troubles do not occur.

As the metal sheets used for holding an intermediate layer therebetween, there can be preferably used a cold rolled steel sheet which is inexpensive and has excellent surface property and workability, zinc-plated steel sheet having excellent corrosion resistance, and the like. However, in addition to the above described steel sheets, any metal sheets can be used when the metal sheets have not been subjected to a treatment, for example, vinyl coating, which checks the electroconductivity. Accordingly, metal sheets can be freely selected depending upon the performance to be required in the resulting lightweight composite material.

As the treatment for preventing secondary aggregation of graphite, a particular method is not necessary, but there can be used ordinarily and widely used methods, such as kneading of graphite together with gelled resin, use of surfactant and the like.

The following example is given for the purpose of illustration of this invention and is not intended as a limitation thereof.

EXAMPLE

Intermediate layers having three kinds of thicknesses of 0.4, 0.6 and 0.8 mm were produced in the following manner. The graphite content R in the resulting intermediate layer was set to 30% and graphite having such a particle size distribution that the volume percentage V defined in the present invention corresponding to the thickness of the intermediate layer was 80% was produced. (This graphite satisfies the condition shown by the formula of $\sqrt{R} \times V \geqq 240$.) The graphite was subjected to a treatment for preventing secondary aggregation and then mixed with a thermoplastic resin, such as polypropylene, polyethylene, nylon or the like, in an amount that the resulting mixture has a graphite content R of 30%, and the mixture was formed into intermediate layers having the above described three kinds of thicknesses. Each of the resulting intermediate layers was held between two cold rolled steel sheets having a thickness of 0.2, 0.3 or 0.4 mm, respectively, and the resulting mass was pressed to adhere the intermediate layer to the steel sheets. The resulting laminated steel sheets were examined with respect to the weight ratio, bending rigidity and spot weldability. The obtained results are shown in the following Table 1. Sample No. 10 in Table 1 is a comparative steel sheet and is a unitary cold rolled steel sheet having a thickness of 0.8 mm. In Table 1, the weight ratio in total thickness is a relative weight of a sample steel sheet in the total thickness based on the weight, calculated as 100, of sample No. 10 of the above described comparative steel sheet having a thickness of 0.8 mm. The bending rigidity of a sample steel sheet is indicated by the load at the 1 mm deformation thereof when the bending rigidity is measured by a method, wherein a composite material 6 consisting of metal sheets 2 and an intermediate layer 4 is supported on both ends in a dimension shown in FIG. 3, and a load is applied to the composite material at the center by means of a punch.

TABLE 1

| Sample No. | Steel sheet | Thickness of intermediate layer (mm) | Thickness of steel sheet (mm) | Total thickness (mm) | Weight ratio in total thickness | Load at 1 mm deformation (kg) | Spot welding |
|---|---|---|---|---|---|---|---|
| 1 | Laminated steel sheet of this invention | 0.4 | 0.2 | 0.8 | 58 | 0.8 | possible |
| 2 | Comparative |  | 0.3 | 1.0 | 83 | 1.8 | possible |
| 3 | laminated steel sheet |  | 0.4 | 1.2 | 108 | 3.6 | possible |
| 4 | Laminated | 0.6 | 0.2 | 1.0 | 62 | 1.3 | possible |
| 5 | steel sheet of this invention |  | 0.3 | 1.2 | 87 | 2.8 | possible |
| 6 | Comparative laminated steel sheet |  | 0.4 | 1.4 | 112 | 4.9 | possible |
| 7 | Laminated | 0.8 | 0.2 | 1.2 | 67 | 1.9 | possible |
| 8 | steel sheet |  | 0.3 | 1.4 | 83 | 4.3 | possible |
| 9 | of this invention |  | 0.4 | 1.6 | 117 | 6.5 | possible |
| 10 | Comparative unitary steel sheet | 0 | 0.8 | 0.8 | 100 | 0.9 | possible |

It can be seen from Table 1 that all of the laminated steel sheets of the present invention can be spot welded and further have a lightweight and a high deformation load. For example, in the comparison of sample No. 4 of a laminated steel sheet of the present invention, which consists of an intermediate layer having a thickness of 0.6 mm and held between two cold rolled steel sheets, each having a thickness of 0.2 mm, and has a thickness of 1.0 mm, with sample No. 10 of a comparative unitary cold rolled steel sheet having a thickness of 0.8 mm, the laminated steel sheet of sample No. 4 of the present invention is lighter in weight by $\{(100-62)/100\} \times 100 = 38\%$ than the comparative unitary steel sheet of sample No. 10 and is higher in deformation load by $\{(1.3\text{ kg}-0.9\text{ kg})/0.9\text{ kg}\} \times 100 = 44\%$ than the comparative steel sheet of sample No. 10. The comparative laminated steel sheets of sample Nos. 2, 3 and 6 can be spot welded, but they have a high weight ratio per unit thickness and they cannot attain the object of the present invention.

As seen from the above described example, according to the present invention, a lightweight composite material capable of being spot welded can be obtained by adjusting the graphite content in the intermediate layer and the particle size distribution of the graphite to be contained in the layer. Therefore, the weight of automotive parts, which are required to have a high bending rigidity, can be decreased. Further, the laminated steel sheet of the present invention is excellent in the vibration-damping property and heat insulating property due to the use of resin in its intermediate layer, and can be expected to be used widely as a material for industrial machine and a material for architecture in addition to the material for automobile.

What is claimed is:

1. In a spot-weldable lightweight composite material consisting of two metal sheets and an intermediate layer consisting of a mixture of resin and graphite and held between the metal sheets, an improvement comprising said intermediate layer having a thickness not smaller than the sum of the thicknesses of the two metal sheets and having a graphite content R of 10–50% by weight, and the graphite having a particle size distribution which satisfies the following relation $$\sqrt{R} \times V \geqq 240$$

wherein R represents the above described graphite content, and V represents the volume percentage of graphite particles, which have a size within the range of from ½ to 1 time thickness of the intermediate layer, based on the total amount of the graphite.

* * * * *